United States Patent [19]

Okumura et al.

[11] Patent Number: 5,051,675
[45] Date of Patent: Sep. 24, 1991

[54] DIRECT TEACHING TYPE ROBOT

[75] Inventors: Hiroshi Okumura; Yutaka Kimura; Eizi Matumoto, all of Nagoya, Japan

[73] Assignee: Mitsubishi Jukogyo Kabushiki Kaisha, Tokyo, Japan

[21] Appl. No.: 500,066

[22] Filed: Mar. 27, 1990

[30] Foreign Application Priority Data

Apr. 3, 1989 [JP] Japan .................................. 1-81561

[51] Int. Cl.[5] ............................................ G05B 19/42
[52] U.S. Cl. .......................... 318/568.10; 318/568.11; 318/573; 318/568.13; 364/513; 901/3
[58] Field of Search ................................ 318/560-640; 364/513; 901/3, 7, 9, 12, 13, 16-21

[56] References Cited

U.S. PATENT DOCUMENTS

| 4,360,886 | 11/1982 | Kostas et al. ............. 318/568.18 X |
| 4,385,358 | 5/1983 | Ito et al. ..................... 318/573 X |
| 4,420,812 | 12/1983 | Ito et al. ..................... 901/43 X |
| 4,424,472 | 1/1984 | Jacob-Descombes et al. ............................ 318/568.13 |
| 4,442,387 | 4/1984 | Lindbom ..................... 901/48 X |
| 4,481,591 | 11/1984 | Spongh ................... 318/568.16 X |
| 4,484,120 | 11/1984 | Olex et al. .................. 901/43 X |
| 4,484,294 | 11/1984 | Noss ............................. 901/3 X |
| 4,486,843 | 12/1984 | Spongh et al. ........... 318/568.14 X |
| 4,490,660 | 12/1984 | Tsuchihashi ............... 318/568.13 |
| 4,737,697 | 4/1988 | Maruo et al. .................. 318/568 |
| 4,864,206 | 9/1989 | Onaga et al. ............. 318/568.11 |
| 4,883,938 | 11/1989 | Sarugaku ...................... 901/42 |

FOREIGN PATENT DOCUMENTS

| 205975 | 12/1986 | European Pat. Off. . |
| 3135608 | 3/1983 | Fed. Rep. of Germany . |
| 55-141968 | 11/1980 | Japan . |
| 1418710 | 12/1975 | United Kingdom . |

Primary Examiner—Paul Ip
Attorney, Agent, or Firm—McAulay Fisher Nissen Goldberg & Kiel

[57] ABSTRACT

A direct teaching type robot has a moving arm driven by an electric motor. The moving arm is directly moved to previously store data corresponding to the movement of the moving arm ina robot controller and when operated as the robot, the moving arm is operated on the basis of the stored data. Power lines for the electric motor are cut off in a teaching mode in which movement position of the moving are are taught in the robot.

2 Claims, 2 Drawing Sheets

CONFIGURATION OF EMBODIMENT

1

DIRECT TEACHING TYPE ROBOT

FIELD OF THE INVENTION

The present invention relates to a direct teaching type robot.

BACKGROUND PRIOR ART

In the direct teaching type robot, an operator directly operates the tip and the wrist of a moving arm of the robot to teach the operation positions thereof to the robot. This teaching method can teach a complicated path to the robot with very short teaching time and is accordingly applied to many robots, specifically most of the so-called painting robots.

However, since large operating force is required to operate the tip and the wrist of the moving arm of the robot, it is difficult to operate them so that the above approach can not be utilized and the operator may suffer physical problems such as lumbago. Accordingly, various methods of reducing the operation force in teaching the robot have been proposed in the past.

In a first method, a balancer is employed to cancel the load moment produced by a load of the moving arm of the robot by the balance force moment produced by the force of the balancer so that the force necessary for the operation is reduced.

In a second method, a clutch is disposed between the moving arm of the robot and a servo-motor and, when the servo-motor is used to operate the moving arm, the clutch is coupled between the moving arm of the robot and the servo-motor while, when the teaching operation is made to the robot, the clutch is disconnected.

FIG. 2 is a block diagram showing an embodiment of the second method.

A moving arm 34 is coupled with a position detector 42 and a signal produced from the position detector 42 is supplied to a robot control circuit 35. The robot control circuit 35 is connected through a servo-amplifier 36 to an ac servo-motor 37 and a signal generated by a pulse generator 38 included in the servo-motor 37 is supplied through the servo-amplifier to the robot control circuit 35. The robot control circuit 35 controls the moving arm 34 of the robot by the feedback control of the position and the speed based on the positional signal and the speed signal.

The servo-amplifier 37 is coupled through a clutch 39 to a reduction gear 40 which is coupled with the moving arm 34. The clutch 39 is coupled with a mode switch 41 which is operated by the operator so that the mode of the robot can be changed from some other mode to a direct teaching mode. When the mode of the robot is changed to the direct teaching mode, the drive mechanism of the clutch 39 is disconnected by the clutch 39 while, in the other mode, the drive mechanism is connected to the clutch 39.

When a command signal for moving the moving arm 34 of the robot is supplied to the servo-amplifier 36 from the robot control circuit 35 in the mode except the direct teaching mode, the servo-amplifier 36 supplies a drive signal to the servo-motor 37 in response to the command signal to drive the motor 37. In this case, since the clutch 39 is connected, the moving arm 34 is operated through the reduction gear 40 by the rotating force of the servo-motor 37.

When the direct teaching operation is performed, the operator operates the mode switch 41 to be the direct teaching mode. At this time, the clutch 39 is disconnected from the servo-motor and the reduction gear so that the coupling between the servo-motor 37 and the reduction gear 40 can be disconnected to remove rotation resistance of the servo-motor 37. In this manner, an electromagnetic clutch or an air clutch is disposed as a part of the power transmission mechanism to remove the rotation resistance of the drive device such as the servo-motor so that the servo-motor is disconnected through the clutch during the teaching operation of the robot to reduce the operating force.

In a third method, as disclosed in Japanese Patent Laid-Open No. 62-94284, a motor current during the operation of the robot is detected to calculate reduction torque for the operating force and the calculated reduction torque is supplied to a motor drive device as the torque command to remove the frictional force due to a back electromotive force.

In a fourth method, as disclosed in Japanese Patent Laid-Open No. 63-162172, the operating force at the beginning of operating the robot is detected by a strain detector and friction compensation torque is supplied to the motor through a strain amplifier and a power amplifier to reduce the operating force.

OBJECT AND DESCRIPTION OF THE INVENTION

As described in the second method, it is possible to remove the rotation resistance of the drive motor by disconnecting the drive motor from the power transmission mechanism by the clutch mechanism during the direct teaching operation, although there is a problem that it is required to dispose clutch mechanisms equal in number to the number of operation axes provided in the robot.

Further, since the servo-motor of the robot is required to be free from maintenance, many ac servo-motors have been adopted recently. The ac servo-motor includes a position detector such as a pulse generator as a position and speed control feedback device and the position and the speed are detected by the position detector. However, since the moving arm of the robot which is an object to be moved is disconnected from the ac servo-motor by the clutch mechanism, there is a problem that the position detector such as the pulse generator included in the ac servo-motor can not be used as the position detector for the moving arm of the robot and it is necessary to dispose a new position detector on the side of the moving arm of the robot. There is the same problem in another type of motor in which a position detector is connected with a coupling or the like.

Further, the third and fourth conventional methods in which the torque command is applied to the drive device of the servo-motor to produce the correction torque in the operation direction of the robot so that the frictional force of the drive motor is removed require special circuits such as a detection circuit for the operation direction, a calculation circuit, a correction circuit and the like and accordingly it is expensive. In addition, there is a problem that it is necessary to provide various interlock circuits for the security of the operator since the servo-motor is active electrically.

In order to solve the above problems, it is an object of the present invention to provide a direct teaching type robot having a moving arm driven by an electric motor and including a circuit which disconnects a power line of the electric motor during the teaching operation to remove rotation resistance of the motor.

When the operator operates the moving arm of the robot to teach the operation during the direct teaching operation of the robot, the motor which drives the moving arm is rotated with the movement of the moving arm. At this time, an induced electromotive force is generated in the motor by the rotation of a rotor and the motor operates in the same manner as a generator. In this case, power lines of the motor can be regarded as an output circuit.

The power lines are normally connected to a drive circuit of the motor and a current is supplied to the drive circuit through the power lines. Accordingly, brake torque occurs in the rotor of the motor and this is the rotation resistance for the motor.

In the present invention, the power line circuit is disconnected during the direct teaching operation. When the motor is regarded as the generator, an output circuit thereof is disconnected so that the brake torque does not occur. Accordingly, effects which are substantially identical with those of the prior art in which the clutch is disposed can be obtained.

Further, since only the power line of the motor is cut off without disconnecting the coupling between the motor and the moving arm as described above, the position detector such as the pulse generator included in or connected through the coupling or the like to the motor can be used as it is and can detect the position on the basis of the rotation of the motor.

DETAILED DESCRIPTION OF PREFERRED EMBODIMENTS

Figure 1:
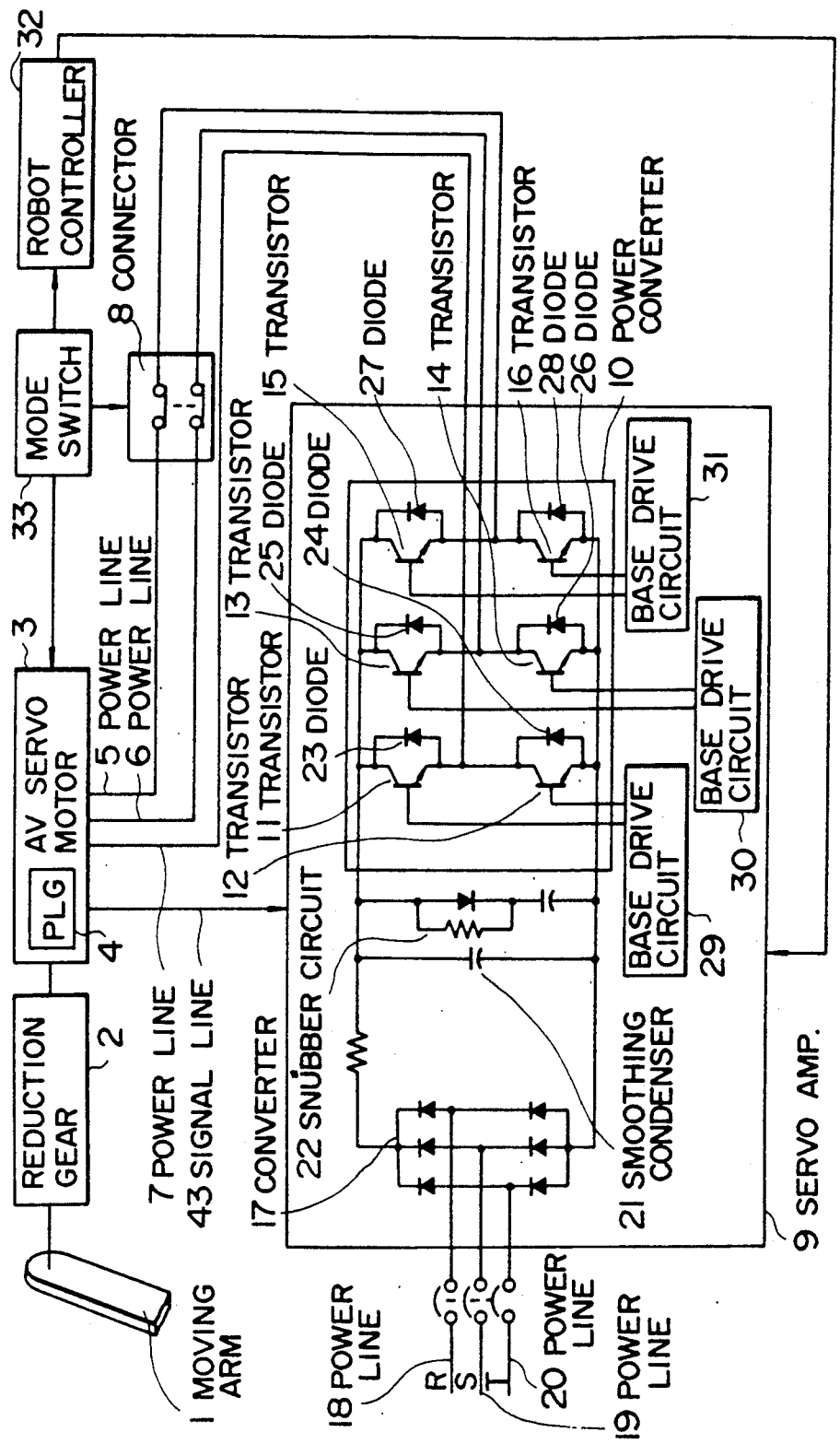
FIG. 1 is a block diagram showing an embodiment of the present invention.
Figure 2:
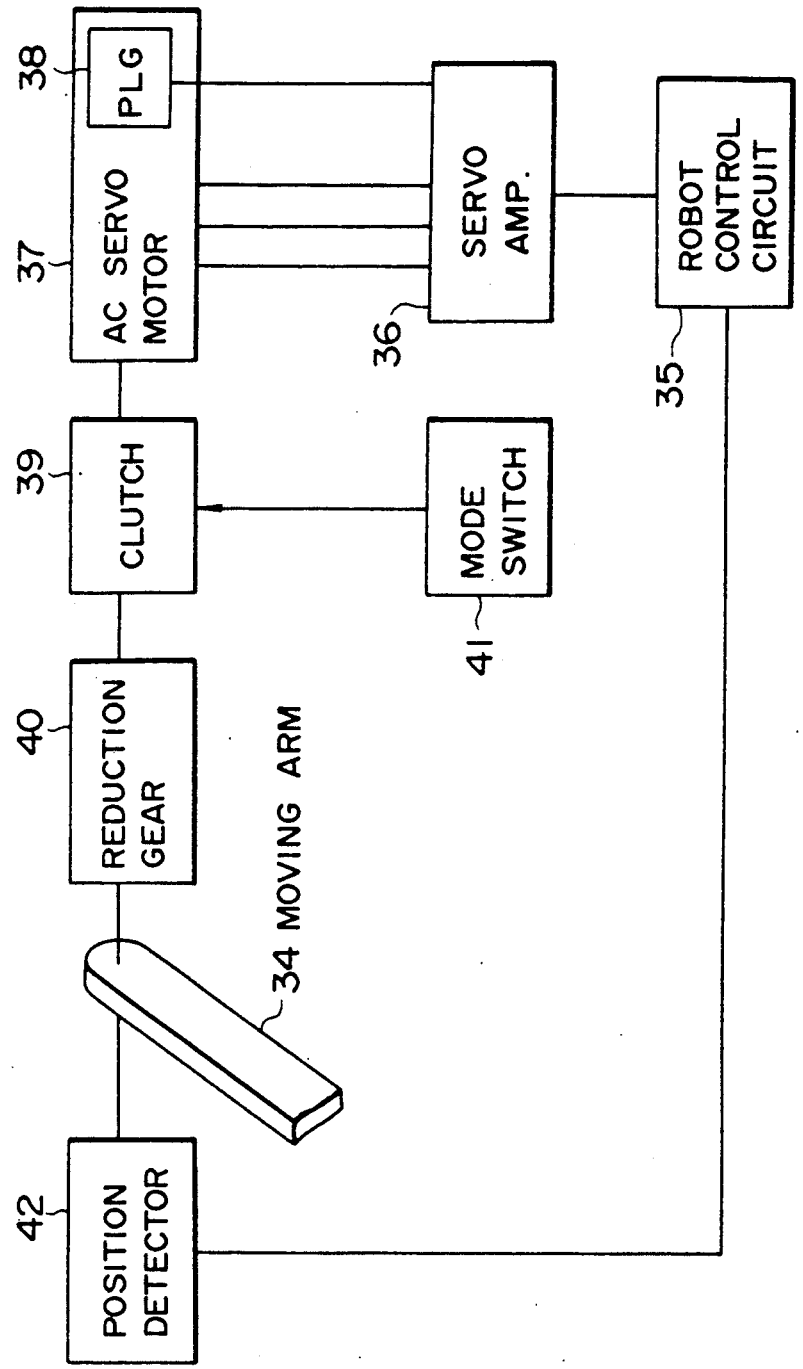
FIG. 2 is a block diagram showing an example of a prior art.

An embodiment of the present invention is now described with reference to the drawing. FIG. 1 is a block diagram showing an embodiment of the present invention. In FIG. 1, numeral 1 denotes a moving arm of a motor driven painting robot which is operated by the operator during the direct teaching operation. The moving arm 1 is driven through a reduction gear 2 by an ac servo-motor 3. The ac servo-motor 3 includes a pulse generator 4 constituting a feedback control device for the position and the speed. Power lines 5 and 6 of power lines 5, 6 and 7 for U, V and W phases, respectively, of the ac servo-motor 3 are connected through a connector 8 to a servo-amplifier 9 and the power line 7 is connected directly to the servo-amplifier 9 and is further connected to a power converter 10 in the servo-amplifier 9. In the servo-amplifier 9, only a power conversion system necessary for description is shown.

The power converter 10 is an inverter circuit including six transistors 11, 12, 13, 14, 15 and 16 with the transistors 11 and 12 connected in series to each other, the transistors 13 and 14 connected in series to each other, the transistors 15 and 16 connected in series to each other, the power line 5 connected to the junction between the transistors 15 and 16, the power line 6 connected to the junction between the transistors 13 and 14, and the power line 7 connected to the junction between the transistors 11 and 12. The collectors of the transistors 11, 13 and 15 and the emitters of the transistors 12, 14 and 16 are connected to a converter 17.

Power lines 18, 19 and 20 of a commercial power source (not shown) are connected to the converter 17. A smoothing condenser 21 and a snubber circuit 22 are connected in parallel to the converter 17.

Protection diodes 23, 24, 25, 26, 27 and 28 are connected between the collector and the emitter of the transistors 11, 12, 13, 14, 15 and 16. A base driven circuit 29 is connected to the transistors 11 and 12, a base drive circuit 30 is connected to the transistors 13 and 14, and the base drive circuit 31 is connected to the transistors 15 and 16.

A robot controller 32 is connected to the servo-amplifier 9 and a mode switch 33 connected to the connector 8 is connected to a robot control panel (not shown).

If there is no connector 8 and the power lines 5, 6 and 7 are connected to the servo-amplifier 9, when the servo-motor 3 is rotated in accordance with the teaching operation, an induced electromotive force is generated in the servo-motor 3 so that electric power is supplied through the power lines 5, 6 and 7 to the power converter 10 and brake torque is produced. This is caused by the fact that the protection diodes 23, 24, 25, 26, 27 and 28 constitute a full-wave rectifying circuit in the same manner as the converter 17 and a current is supplied to the smoothing condenser 21 from the servo-amplifier 3 so as to charge the smoothing condenser 21.

On the contrary, when the mode switch 33 is switched to the direct teaching mode during the direct teaching operation and the connector 8 is operated by a signal of the mode switch 33 so that the power lines 5 and 6 are cut off, the smoothing condenser 21 is not charged through power lines of two or more phases and the brake torque is not produced. Accordingly, it is possible to move the moving arm 1 easily and smoothly.

Further, the pulse generator 4 included in the servo-motor 3 is connected to the servo-amplifier 9 through a signal line 43. Since the servo-motor 3 is connected to the moving arm 1 through the reduction gear 2, the pulse generator 4 included in the ac servo-motor 3 is rotated in response to movement of the moving arm 1 and an output signal of the pulse generator 4 is supplied to the servo-amplifier 9 so that the number of rotation and the position of rotation of the ac servo-motor 3 are detected and supplied to the robot control circuit 32.

As described above, when two phases are disconnected in the servo-motor driven by three phases, the effect is the same as the case where all of three phases are disconnected and it is not necessary to disconnect all of three phases. Necessary numbers of power lines may be disconnected even in the case of a servo-motor other than three phases.

The mode switch 33 is not limited to a mechanical switch but may be a programmable switch or a relay. Further, the connector 8 may be a switch which is operated in mechanically interlocked relationship with the mode switch 33. Alternatively, the connector 8 may be a switch which merely cuts off the power lines during the direct teaching operation.

In the embodiment, the ac servo-motor is employed as the servo-motor for the moving arm of the robot, while a dc servo-motor or another electric motor is available. Further, it is not necessary that the position detector such as the pulse generator be included in the motor. If the position detector is connected to the servo-motor through a coupling or the like, the position detector can be rotated together with the servo-motor and accordingly can be used in the same manner as in the embodiment.

The present invention possesses the following effects:

(1) Since the motor is not disconnected from the moving arm during the direct teaching operation of the robot, it is not necessary to provide a new position detector for detecting the position and the speed of the moving arm.

(2) When the motor is started reversely, the power lines are disconnected to remove the rotation resistance so that effects which are substantially similar to those of the robot provided with a clutch mechanism can be obtained.

(3) Since a circuit such as the connector may be provided in the power lines of the motor, a very simple and inexpensive operating force reducing device can be provided.

We claim:

1. A direct teaching robot capable of being operated in a direct teaching mode and a robot mode comprising: a moving arm, an electric motor connected to the moving arm through a reduction gear, detection means for generating a signal corresponding to a position and/or speed of the moving arm in accordance with rotation of the electric motor, a servo-amplifier having an output for driving the electric motor, a robot controller for controlling the electric motor through the servo-amplifier, said moving arm being directly moved in said teaching mode to pre-store data corresponding to the movement of the moving arm in the robot controller and, when operated in the robot mode, the moving arm being operated on the basis of said pre-stored data, and a power line connecting the electric motor and the output of the servo-amplifier, means for disconnecting the power line between said electrical motor and servo-amplifier in said teaching mode in which movement positions of the moving arm are taught so as to avoid the loading of the motor on the moving arm.

2. A direct teaching type robot according to claim 1, wherein said electric motor comprises a three-phase a.c. servo-motor, said means for cutting off power cuts off two power lines of three power lines to said motor in the teaching mode.

* * * * *